(12) United States Patent
Huang et al.

(10) Patent No.: US 11,652,262 B2
(45) Date of Patent: May 16, 2023

(54) BATTERY MODULE, BATTERY PACK, AND DEVICE

(71) Applicant: CONTEMPORARY AMPEREX TECHNOLOGY CO., LIMITED, Ningde (CN)

(72) Inventors: Haihua Huang, Ningde (CN); Shenglin Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/535,189

(22) Filed: Nov. 24, 2021

(65) Prior Publication Data

US 2022/0085471 A1 Mar. 17, 2022

Related U.S. Application Data

(63) Continuation of application No. PCT/CN2020/118763, filed on Sep. 29, 2020.

(30) Foreign Application Priority Data

Dec. 31, 2019 (CN) .......................... 201922494988.2

(51) Int. Cl.
*H01M 50/572* (2021.01)
*H01M 50/543* (2021.01)

(52) U.S. Cl.
CPC ....... *H01M 50/572* (2021.01); *H01M 50/543* (2021.01); *H01M 2220/20* (2013.01)

(58) Field of Classification Search
CPC ............. H01M 50/572; H01M 50/543; H01M 2220/20
See application file for complete search history.

(56) References Cited

U.S. PATENT DOCUMENTS

| 1,402,673 | A | * | 1/1922 | Skinner | ............... | H01M 50/172 |
| | | | | | | 429/89 |
| 2006/0270286 | A1 | * | 11/2006 | Zhao | .................. | H01M 50/502 |
| | | | | | | 439/840 |

(Continued)

FOREIGN PATENT DOCUMENTS

| CN | 206742348 U | 12/2017 |
| CN | 207651547 U | 7/2018 |

(Continued)

OTHER PUBLICATIONS

English translation of International Search Report with Written Opinion dated Dec. 30, 2020 received in International Application No. PCT/CN2020/118763, 16 pages.

(Continued)

*Primary Examiner* — Miriam Stagg
*Assistant Examiner* — Claire L Roe
(74) *Attorney, Agent, or Firm* — Scully, Scott, Murphy & Presser

(57) ABSTRACT

This application relates to the technical field of energy storage devices, and in particular, to a device, a battery pack, and a battery module. The battery module includes a battery cell and an insulation board. The insulation board includes a body portion and a first bulge. The first bulge includes a sidewall and a top wall that close in to form an accommodation cavity. At least a part of an electrode terminal is accommodated in the accommodation cavity, and the top wall covers a part of the electrode terminal, thereby reducing a risk of letting metal particles or other impurities enter a position between the battery cells, where the metal particles are generated during welding. This reduces difficulty of cleaning the battery module, and improves safety and reliability of the battery module.

12 Claims, 8 Drawing Sheets

(56) References Cited

U.S. PATENT DOCUMENTS

| | | | | |
|---|---|---|---|---|
| 2012/0100401 A1* | 4/2012 | Yasui | ................. | H01M 50/213 |
| | | | | 429/7 |
| 2015/0263396 A1* | 9/2015 | Kitamura | ............ | H01M 10/486 |
| | | | | 324/426 |
| 2016/0093863 A1 | 3/2016 | DeKeuster et al. | | |
| 2019/0067651 A1* | 2/2019 | Li | .................... | H01M 50/3425 |
| 2019/0372076 A1 | 12/2019 | Yanagida et al. | | |
| 2020/0321589 A1* | 10/2020 | Watahiki | ............ | H01M 50/503 |
| 2022/0006145 A1 | 1/2022 | Su et al. | | |

FOREIGN PATENT DOCUMENTS

| | | |
|---|---|---|
| CN | 110061171 A | 7/2019 |
| CN | 209087917 U | 7/2019 |
| CN | 209496906 U | 10/2019 |
| CN | 211017199 U | 7/2020 |
| DE | 102008010838 A1 | 8/2009 |
| JP | 2009059663 A | 3/2009 |
| JP | 2011529245 A | 12/2011 |
| JP | 2017016734 A | 1/2017 |
| KR | 20120023788 A | 3/2012 |

OTHER PUBLICATIONS

Notice of Reasons for Refusal dated Dec. 23, 2022 received in Japanese Patent Application No. JP 2022-538996.
Notice of Preliminary Rejection dated Dec. 26, 2022 received in Korean Patent Application No. KR 10-2022-7020005.

* cited by examiner

BATTERY MODULE, BATTERY PACK, AND DEVICE

CROSS-REFERENCE TO RELATED APPLICATIONS

This application is a continuation of International Application No. PCT/CN2020/118763, filed on Sep. 29, 2020, which claims priority to Chinese Patent Application No. 201922494988.2, filed with the Chinese Patent Office on Dec. 31, 2019 and entitled "BATTERY MODULE, BATTERY PACK, AND DEVICE", both of which are hereby incorporated by reference in their entireties.

TECHNICAL FIELD

This application relates to the technical field of energy storage devices, and in particular, to a battery module, a battery pack, and a device.

BACKGROUND

A battery module includes a plurality of battery cells, and a battery cell includes electrode terminals. Different electrode terminals are connected by connecting plates, so that the plurality of battery cells are connected. Generally, a connecting plate is connected to an electrode terminal by welding. Metal particles generated during the welding are scattered between the battery cells, and are very difficult to clean up. In addition, the metal particles are likely to cause a short circuit between adjacent battery cells and bring hazards.

SUMMARY

This application provides a battery module, a battery pack, and a device. The battery module reduces a probability for metal particles and other impurities to enter regions between battery cells, reduces difficulty of cleaning the battery module, and improves safety and reliability of the battery pack.

This application provides a battery module, including:
a battery cell, including electrode terminals; and
an insulation board, disposed on a top of the battery cell, where the insulation board includes a body portion and a first bulge protruding in relation to the body portion, where
the first bulge includes a sidewall connected to the body portion and a top wall connected to a top of the sidewall, the sidewall and the top wall are configured to close in to form an accommodation cavity, at least a part of each electrode terminal is accommodated in the accommodation cavity, and the top wall covers a part of the electrode terminal.

Therefore, compared with an insulation board of a conventional battery module, the insulation board according to this application can not only shield each battery cell, but also cover a part of the electrode terminal by using the first bulge, thereby reducing a risk of letting metal particles enter a position between the battery cells, reducing difficulty of cleaning the battery module, and improving safety and reliability of the battery module.

In a possible design, a via hole is disposed on the top wall. The via hole runs through to the accommodation cavity. A part of the electrode terminal is exposed out of the via hole.

In a possible design, the electrode terminal includes a base portion and a first connecting portion protruding from the base portion. The top wall covers at least a part of the base portion. The first connecting portion is exposed out of the via hole.

In a possible design, along a thickness direction of the insulation board, a top surface of the first connecting portion is not lower than a top surface of the top wall.

In a possible design, the battery module further includes a connecting plate. The connecting plate is located on a side of the insulation board away from the battery cell.

The connecting plate is configured to connect the part of the electrode terminal, the part being exposed out of the via hole.

In a possible design, the connecting plate covers the via hole.

In a possible design, an accommodation slot is disposed on the body portion. The first bulge is disposed on a bottom wall of the accommodation slot.

In a possible design, a plurality of second bulges connected to the bottom wall are disposed on the body portion. Each second bulge is located on an outer rim of the first bulge. A protrusion direction of the second bulge is identical to that of the first bulge.

In a possible design, the insulation board includes a flange. The flange is disposed on an outer rim of the body portion.

An extension direction of the flange is identical to the protrusion direction of the first bulge.

A second aspect of this application provides a battery pack. The battery pack includes a box body and the battery module described above. The battery module is accommodated in the box body.

A third aspect of this application provides a device, including:
the battery pack described above, where battery pack is configured to provide electrical energy.

In this application, a first bulge is disposed on the insulation board. The first bulge may include a sidewall and a top wall that define an accommodation cavity. Compared with the insulation board of a conventional battery module, the insulation board according to this application can not only shield each battery cell, but also cover a part of the electrode terminal by using the first bulge, thereby reducing the risk of letting metal particles enter a position between the battery cells, reducing difficulty of cleaning the battery module, and improving safety and reliability of the battery module.

Understandably, the above general description and the following detailed description are merely exemplary without limiting this application.

BRIEF DESCRIPTION OF DRAWINGS

To describe the technical solutions in the embodiments of this application or the prior art more clearly, the following outlines the drawings to be used in the description of the embodiments of this application or the prior art. Apparently, the drawings outlined below are merely some embodiments of this application, and a person of ordinary skill in the art may derive other drawings from the outlined drawings without making any creative efforts.

REFERENCE NUMERALS

Figure 1:
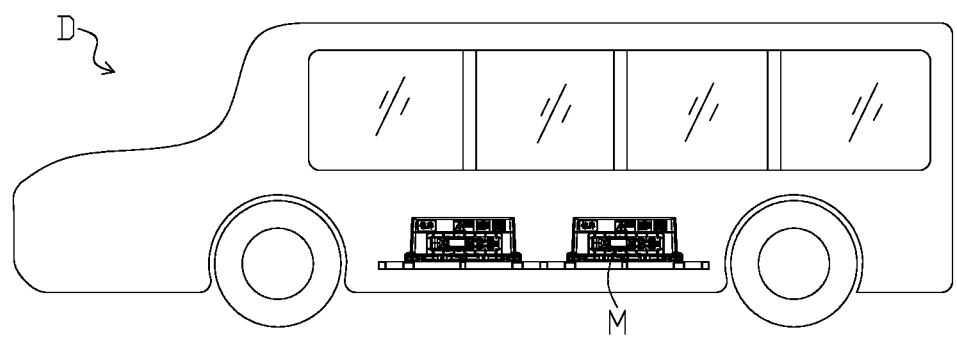
FIG. 1 is a schematic structural diagram of a device according to an embodiment of this application.

A—Battery module;
A1—Battery cell array;
M—Battery pack;
M1—Box body;
M2—Cavity;
D—Device;
1—Battery cell;
11—Electrode terminal;
111—Base portion;
112—First connecting portion;
2—Insulation board;
21—Body portion;
211—Accommodation slot;
211a—Bottom wall;
22—First bulge;
221—Sidewall;
222—Top wall;
222a—Via hole;
23—Flange;
24—Second bulge;
25—Third bulge;
3—Connecting plate;
31—Recess; and
32—Second connecting portion.

The drawings described here are incorporated into the specification as a part of the specification. The drawings illustrate embodiments of this application and are used together with the specification to interpret the principles of this application.

DETAILED DESCRIPTION OF EMBODIMENTS

For better understanding of the technical solutions of this application, the following describes embodiments of this application in detail with reference to accompanying drawings.

It is apparent that the described embodiments are only a part rather than an entirety of the embodiments of this application. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precede a singular noun in the embodiments and claims of this application are intended to include the plural form thereof.

Understandably, the term "and/or" used herein only describes an association relationship between associated objects and indicates existence of three relationships. For example, "A and/or B" may indicate existence of A alone, coexistence of A and B, and existence of B alone. In addition, the character "/" herein generally indicates an "or" relationship between the object preceding the character and the object following the character.

In the context of this application, unless otherwise expressly specified and defined, the terms "first", "second", and "third" are for the sole purpose of description rather than indicating or implying any order of preference; unless otherwise expressly specified, the term "a plurality of" means two or more; and the terms such as "connect" and "fix" are to be understood in a broad sense. For example, a "connection" may be a fixed connection, or a detachable connection, or an integrated connection, or an electrical connection; and may be a direct connection or an indirect connection implemented through an intermediate medium. A person of ordinary skill in the art can understand the specific meanings of the terms in this application according to the context.

It needs to be noted that localizers such as "on", "above", "under", "below", "left", and "right" used in the embodiments of this application are described from a perspective shown in the accompanying drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

An embodiment of this application provides a device that uses a battery cell as a power supply, a battery pack, and a battery module. The device that uses a battery cell as a power supply may be a vehicle, a ship, a small aircraft, an energy storage cabinet, or the like. In a possible design, the device may contain a power source, and the power source is used to provide a driving force for the device. The power source may be configured as a battery module or pack that provides electrical energy to the device. The driving force of the device may be sole electrical energy, or may include electrical energy and other types of energy (such as mechanical energy). The power source may be a battery module (or a battery pack), or may be a combination of a battery module (or battery pack) and an engine, or the like. Therefore, all devices that can use a battery cell as a power supply fall within the protection scope of this application.

As shown in FIG. 1, using a vehicle as an example, a vehicle according to an embodiment of this application may be a new energy vehicle. The new energy vehicle may be a battery electric vehicle, or may be a hybrid electric vehicle, a range-extended electric vehicle, or the like. The vehicle may include a battery pack M and a vehicle body. The battery pack M is disposed in the vehicle body. A driving motor is further disposed in the vehicle body, and the driving motor is electrically connected to the battery pack M. The battery pack M provides electrical energy. The driving motor is connected to wheels of the vehicle body through a transmission mechanism to drive the vehicle to run. Specifically, the battery pack M may be horizontally disposed at a bottom of the vehicle body.

Figure 2:
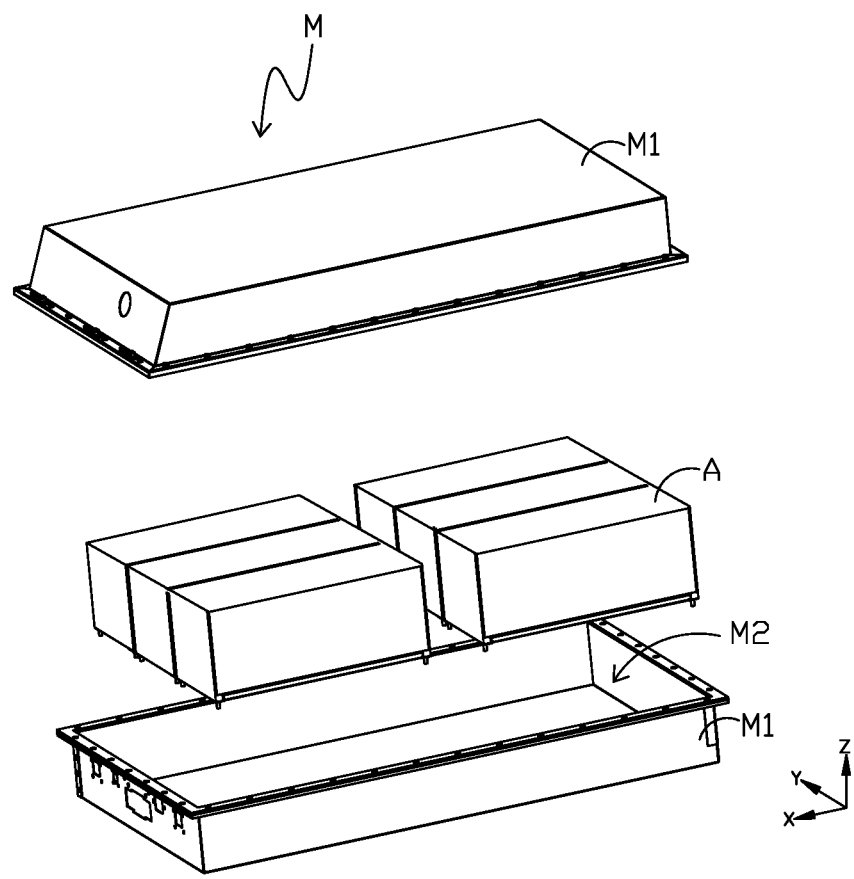
FIG. 2 is a schematic structural diagram of a battery pack according to an embodiment of this application.
Figure 3:
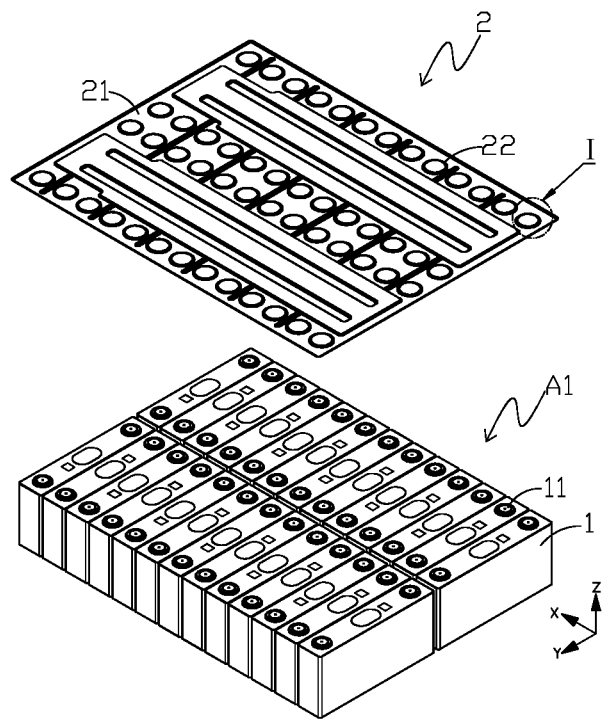
FIG. 3 is a schematic structural diagram of an insulation board and a battery cell array according to an embodiment of this application.

As shown in FIG. 2, the battery pack M includes a box body M1 and a battery module A. The box body M1 contains a cavity M2. The battery module A is accommodated in the cavity M2. The battery module A may be one or more in number. A plurality of battery modules A are arranged in the accommodation cavity. The box body M1 is not limited in terms of type, and may be a frame shape, a disk shape, or a box shape. Specifically, as shown in FIG. 2, the box body M1 may contain a lower box that accommodates the battery module A and an upper box that fits the lower box.

More specifically, the battery module A includes a plurality of battery cells 1. The plurality of battery cells 1 are stacked alongside each other in a length direction X to form a battery cell array A1.

Each battery cell 1 includes electrode terminals 11. The electrode terminals 11 are configured to output electrical energy. Each battery cell 1 includes a positive electrode terminal and a negative electrode terminal. In the battery module A, the plurality of battery cells 1 are electrically connected, and specifically, may be connected in series and/or parallel or the like. The battery cells 1 are connected to each other by a connecting plate 3. For example, when the plurality of battery cells 1 are connected in series, a positive electrode terminal of one battery cell 1 is connected to a negative electrode terminal of another battery cell 1 by the connecting plate 3.

Generally, the connecting plate 3 is welded to the positive electrode terminal and the negative electrode terminal. Metal particles are generated during the welding. The metal particles are scattered throughout the battery module A, for example, scattered between different battery cells 1 and between the electrode terminal 11 and the connecting plate 3. Consequently, through the metal particles, a short circuit may occur between adjacent battery cells 1, and between the electrode terminal 11 and the connecting plate 3, thereby affecting the charge and discharge process of the battery module A. Therefore, after the connecting plate 3 is welded to the electrode terminal 11, the battery module A needs to be cleaned to remove the metal particles in the battery module A to improve the safety and reliability of the battery module A.

Generally, after completion of welding the connecting piece 3 to the electrode terminal 11, the battery module A may be cleaned by performing steps such as turning over, adsorbing, and cleaning, so as to remove the metal particles in the battery module A. However, when each battery cell 1 is fixed (specifically, fixed by adhesive bonding or the like) in the box body M1 of the battery pack M first before the connecting plate 3 is welded to the electrode terminal 11, the cleaning can be performed for the battery pack M as a whole, and adsorption cleaning can hardly be performed for the battery pack M, resulting in a risk of leaving residual metal particles in the battery pack M.

In some embodiments, the conventional battery module A may further include an insulation board. The insulation board lies as a covering above the electrode terminal 11 of each battery cell 1. The connecting plate 3 is located above the insulation board. A via hole configured to pass the electrode terminal 11 is disposed on the insulation board. A relatively large gap exists between the via hole and the electrode terminal 11 so that the electrode terminal 11 that passes through the via hole can be welded to the connecting plate 3. In this solution, the via hole of the insulation board is also a place where the metal particles are likely to be scattered, and is difficult to clean up.

To solve this technical problem, as shown in FIG. 3 to FIG. 6, an embodiment of this application provides a battery module A. The battery module A may include at least one battery cell 1 and an insulation board 2. The battery cells 1 are stacked alongside each other in the length direction X to form a battery cell array A1. Each battery cell 1 includes electrode terminals 11. The insulation board 2 is disposed on the top of the battery cell 1. The insulation board 2 may include a body portion 21. A first bulge 22 exists on and protrudes from the body portion 21.

Figure 4:
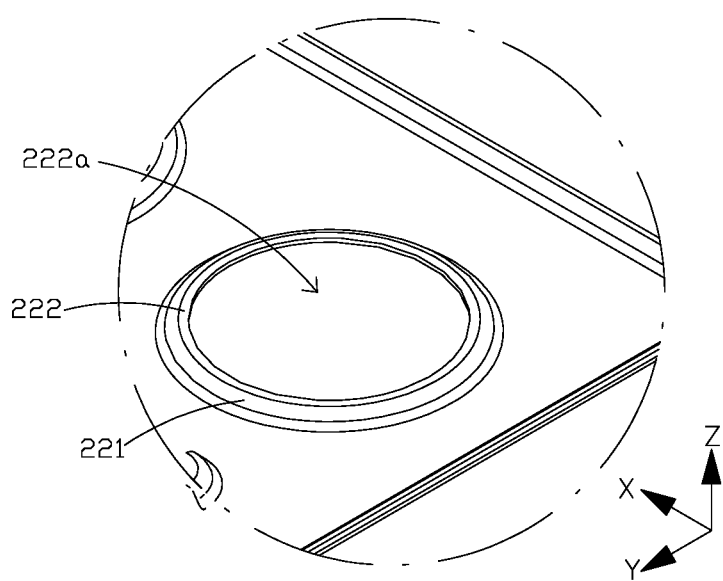
FIG. 4 is a local detailed view of a position I shown in FIG. 3.
Figure 5:
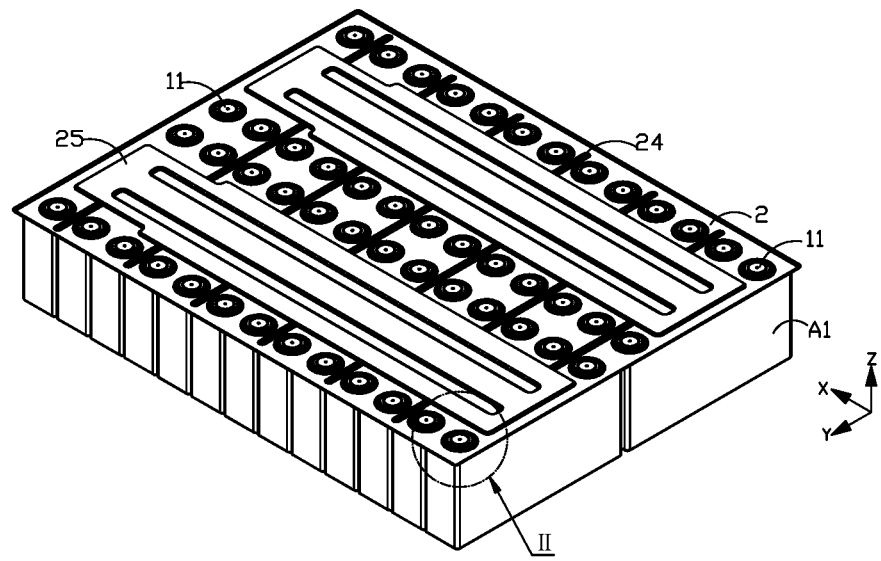
FIG. 5 is a schematic structural diagram of an insulation board mounted in a battery cell array according to an embodiment of this application.
Figure 6:
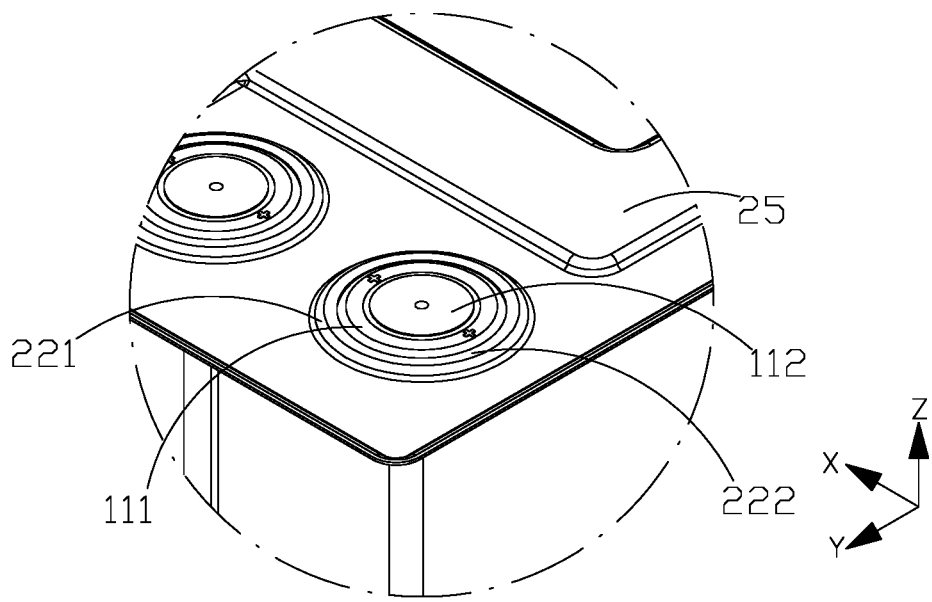
FIG. 6 is a local detailed view of a position II shown in FIG. 5.

Specifically, as shown in FIG. 4, the first bulge 22 may include a sidewall 221 and a top wall 222. The top wall 222 is connected to the body portion 21 through the sidewall 221, and the top wall and sidewall define an accommodation cavity. When the insulation board 2 is connected to the battery cell array A1, at least a part of the electrode terminal 11 is located in the accommodation cavity. The top wall 222 of the first bulge 22 covers a part of the electrode terminal 11.

In the battery module A according to this embodiment of this application, the insulation board 2 disposed on the top of the battery cell 1 can shield each battery cell 1, reduce the risk of letting the metal particles and other impurities enter a position between the battery cells 1, and reduce the difficulty of cleaning the battery module A. In addition, the insulation board 2 can insulate each battery cell 1 from other metal parts, thereby improving reliability of the battery cell 1. In some embodiments, the insulation board 2 covers a part of the electrode terminal 11 through the first bulge 22, thereby reducing the risk of letting the metal particles and other impurities enter the regions between adjacent battery cells 1 through the insulation board 2. In addition, when the metal particles fall on the first bulge 22, the metal particles can slide down onto the insulation board 2 through the sidewall 221 of the first bulge 22, thereby further reducing the risk of letting the metal particles enter the battery module A. In this way, the metal particles and other impurities just attach to the surface of the insulation board 2. In cleaning the battery module A after completion of the welding, it is necessary to clean just the surface of the insulation board 2 away from the battery cell 1, but not necessary to clean the positions between the battery cells 1, thereby reducing difficulty of cleaning the battery module A and improving the safety and reliability of the battery module A.

In a possible design, as shown in FIG. 4, a via hole 222a may be disposed on the top wall 222 of the first bulge 22. The via hole 222a runs through the top wall 222 and communicates to the accommodation cavity. A part of the electrode terminal 11 can extend out along the via hole 222a. That is, a part of the electrode terminal 11 is exposed out of the via hole 222a. This part of the electrode terminal 11 may be configured to connect to the connecting plate 3, for example, by welding, so as to implement electrical connection of the battery cell 1.

In this embodiment, when a part of the electrode terminal 11 extends out along the via hole 222a of the first bulge 22, the electrode terminal 11 can be welded to the connecting plate 3. Moreover, before the welding, the part of the electrode terminal 11, which extends out of the via hole 222a, can be located by means of the via hole 222a to increase accuracy of connection of the connecting plate 3, thereby improving the stability of the connection between the connecting plate 3 and the electrode terminal 11.

Specifically, the sidewall of the part of the electrode terminal 11, the part extending out of the via hole 222a, may abut against the sidewall of the via hole 222a. That is, there is no gap or just a small gap between the electrode terminal 11 and the sidewall of the via hole 222a, thereby further reducing the risk of letting the metal particles or other impurities fall into the battery module A.

Figure 7:
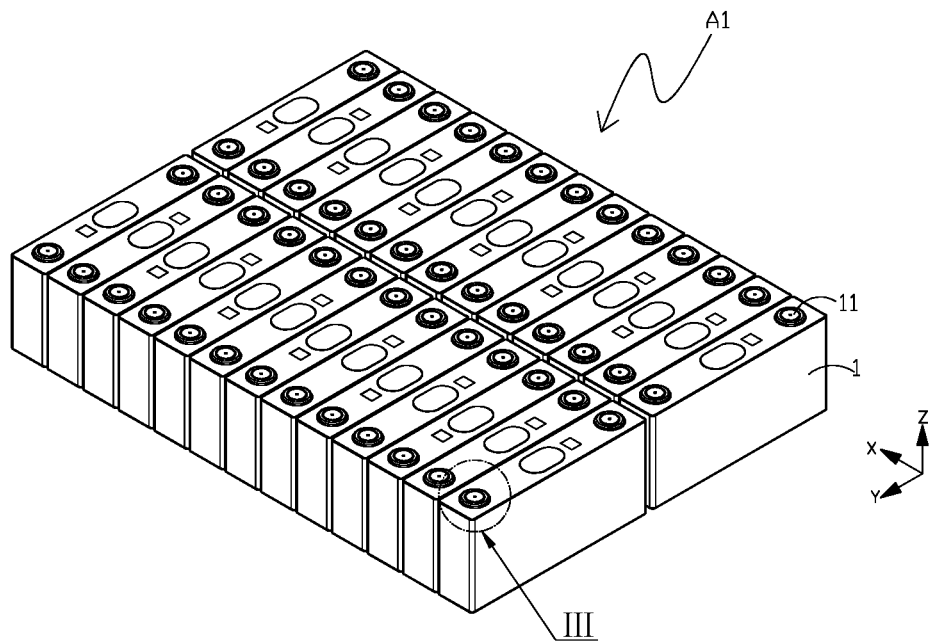
FIG. 7 is a schematic structural diagram of a battery cell array according to an embodiment of this application.
Figure 8:
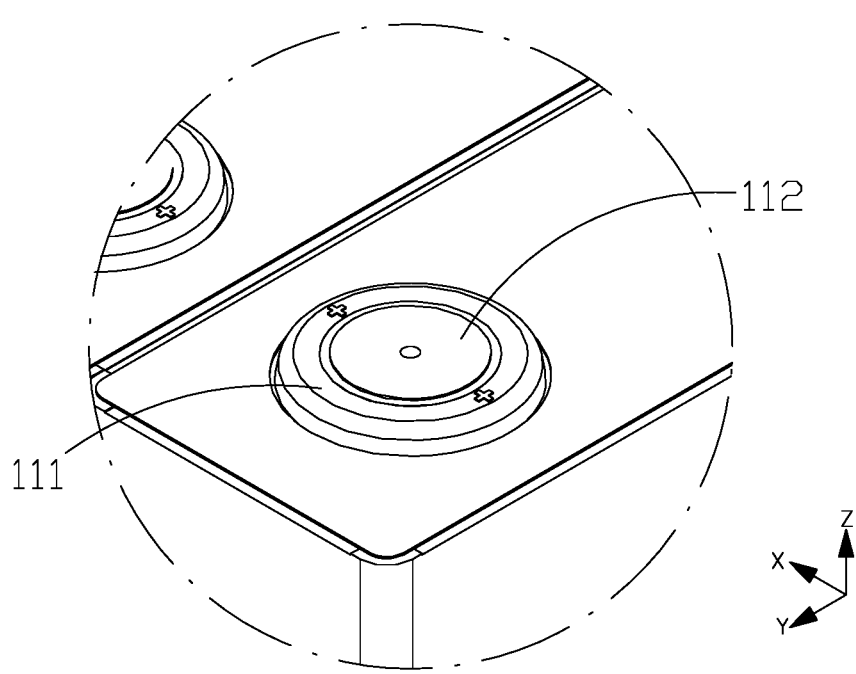
FIG. 8 is a local detailed view of a position III shown in FIG. 7.

In a possible design, as shown in FIG. 7 and FIG. 8, the electrode terminal 11 may include a base portion 111 and a first connecting portion 112. The first connecting portion 112 protrudes against the base portion 111. When the insulation board 2 is connected to the battery cell array A1, the first connecting portion 112 can extend out along the via hole 222a. The top wall 222 of the first bulge 22 covers at least a part of the base portion 111.

In this embodiment, when the insulation board 2 is connected to the battery cell array A1, because the first connecting portion 112 of the electrode terminal 11 extends out of the corresponding via hole 222a, the insulation board 2 and the battery cell array A1 can be located through each base portion 111 and the sidewall of the via hole 222a, thereby improving the accuracy of the positions of and reliability of connection between the insulation board 2 and the battery cell array A1. In some embodiments, when the top wall 222 of the first bulge 22 of the insulation board 2 covers at least a part of the base portion 111 of the corresponding electrode terminal 11, the gap between the electrode terminal 11 and the via hole 222a of the insulation board 2 is further reduced, thereby reducing the risk of letting the metal particles or other impurities enter the accommodation cavity and reducing the risk of letting the metal particles or other impurities enter the battery module A.

Specifically, as shown in FIG. 8, in a possible design, along the thickness direction of the insulation board 2, a top surface of the first connecting portion 112 is not lower than a top surface of the top wall 222. That is, the first connecting portion 112 is flush with or protruding against the top wall 222. Such a design facilitates the electrode terminal 11 to connect to the connecting plate 3 through the first connecting portion 112, and also facilitates the locating of the connecting plate 3 and the electrode terminal 11 at the time of connecting with the connecting plate 3.

Figure 9:
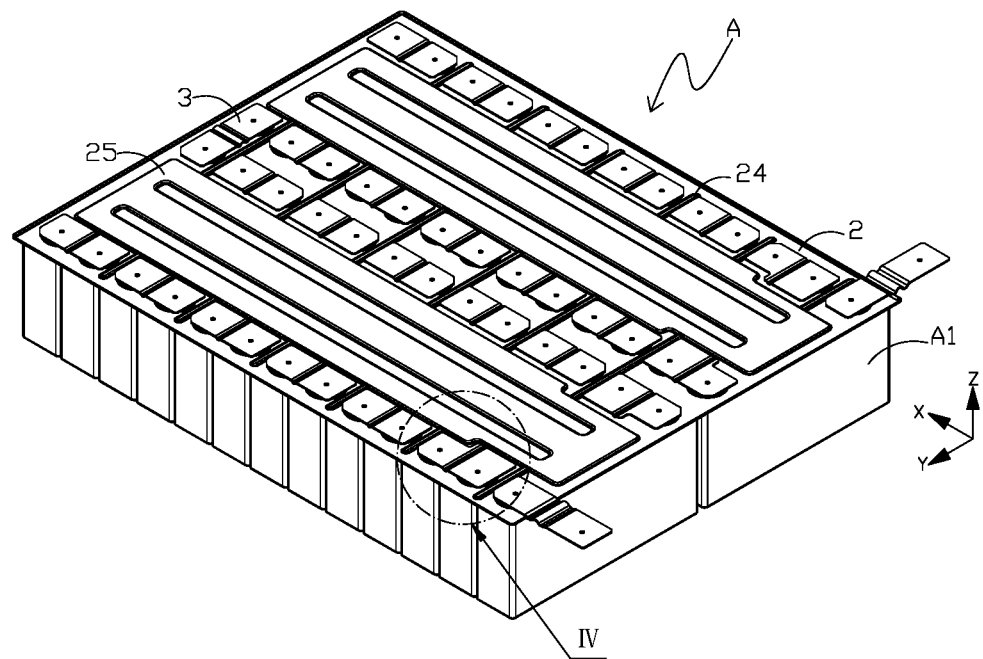
FIG. 9 is a schematic structural diagram of a battery module according to an embodiment of this application.

On the other hand, as shown in FIG. 9, the connecting plate 3 is situated on a side of the insulation board 2 away from the battery cell 1, and is connected to a part of the electrode terminal 11, the part being exposed out of the via hole 222a. This facilitates the welding between the connecting plate 3 and the electrode terminal 11. In addition, the welding position between the connecting plate 3 and the electrode terminal 11 is on a side of the insulation board 2 away from the battery cell 1. Therefore, the risk of letting the metal particles generated during welding fall into the position between the battery cells 1 is further reduced, and the safety and reliability of the battery module A are improved.

Figure 10:
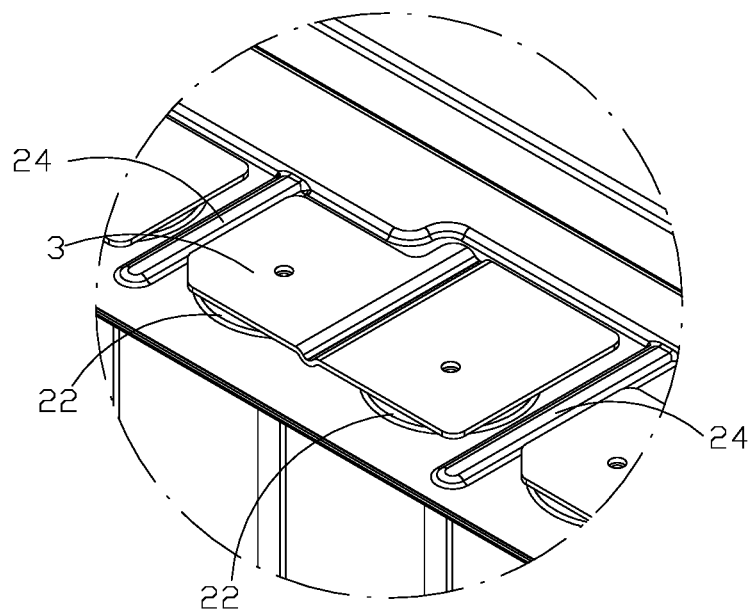
FIG. 10 is a local detailed view of a position IV shown in FIG. 9.

Specifically, as shown in FIG. 10, after the connecting plate 3 is welded to the electrode terminal 11, the connecting plate 3 can cover the via hole 222a. When the position of the first connecting portion 112 of the electrode terminal 11 deviates, the connecting plate 3 can still be welded to the first connecting portion 112, thereby reducing a risk that the connecting plate 3 fails to be welded to the corresponding electrode terminal 11 due to the deviation of the position of the electrode terminal 11 from a preset position. This improves the stability of connection between the connecting plate 3 and the electrode terminal 11. In addition, because the connecting plate 3 covers the via hole 222a, a contact area between the connecting plate 3 and the electrode terminal 11 is relatively large, thereby further improving the stability of connection between the connecting plate and the electrode terminal. Moreover, this increases a passage area between the electrode terminal 11 and the connecting plate 3, and reduces a risk of over temperature of the connecting plate 3 and the electrode terminal 11.

Figure 11:
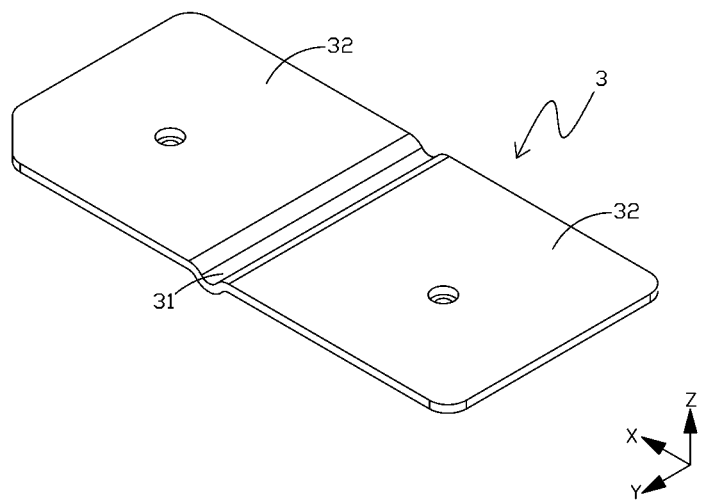
FIG. 11 is a schematic structural diagram of a connecting piece according to an embodiment of this application.

More specifically, as shown in FIG. 11, the connecting plate 3 may include a recess 31 and at least two second connecting portions 32. The second connecting portions 32 are situated on two opposite sides of the recess 31 respectively. The second connecting portions 32 and the recess 31 may be integrally formed. The recess 31 is recessed toward the insulation board 2. The second connecting portions 32 are configured to connect to the first connecting portion 112 of the electrode terminal 11. At the time of connecting, the recess 31 may be situated between the two electrode terminals 11 connected to the connecting plate 3, so as to facilitate locating of the connecting plate 3 and reduce a risk of failure of connecting the connecting plate 3 to the corresponding electrode terminal 11 caused by a position error of the connecting plate 3. In some embodiments, the area of each second connecting portion 32 is larger than the area of the via hole 222a of the top wall 222, and the connecting piece 3 can cover each via hole 222a through the second connecting portion 32.

Figure 12:
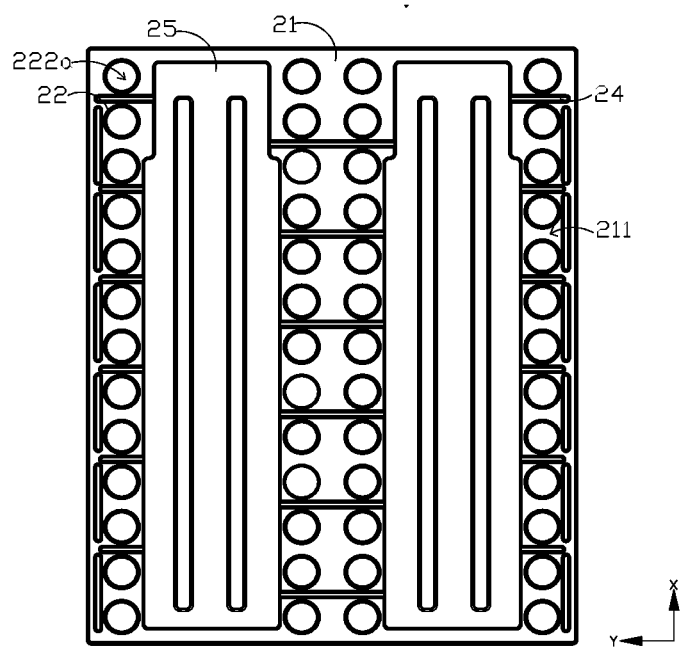
FIG. 12 is a top view of an insulation board according to an embodiment of this application.

As shown in FIG. 12, in a possible design, an accommodation slot 211 may be disposed on the body portion 21 of the insulation board 2. Specifically, a recessed region may be disposed on the body portion 21. The recessed region is recessed toward the electrode terminal 11 to form the accommodation slot 211. The first bulge 22 is situated on a bottom wall 211a of the accommodation slot 211.

In this embodiment, the metal particles generated by welding can slide down from the sidewall 221 of the first bulge 22 into the accommodation slot 211. Therefore, the accommodation slot 211 is configured to collect the metal particles generated at the time of welding the connecting plate 3 to the electrode terminal 11. In addition, the cleaning of the battery module A after completion of the welding is just to clean the accommodation slot 211.

Figure 13:
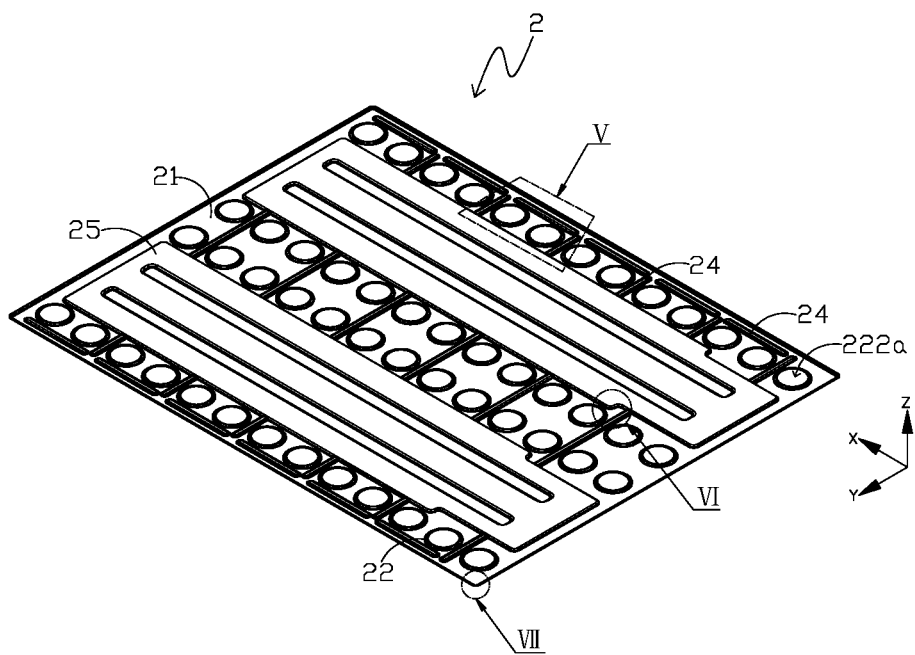
FIG. 13 is a schematic structural diagram of an insulation board according to an embodiment of this application.
Figure 14:
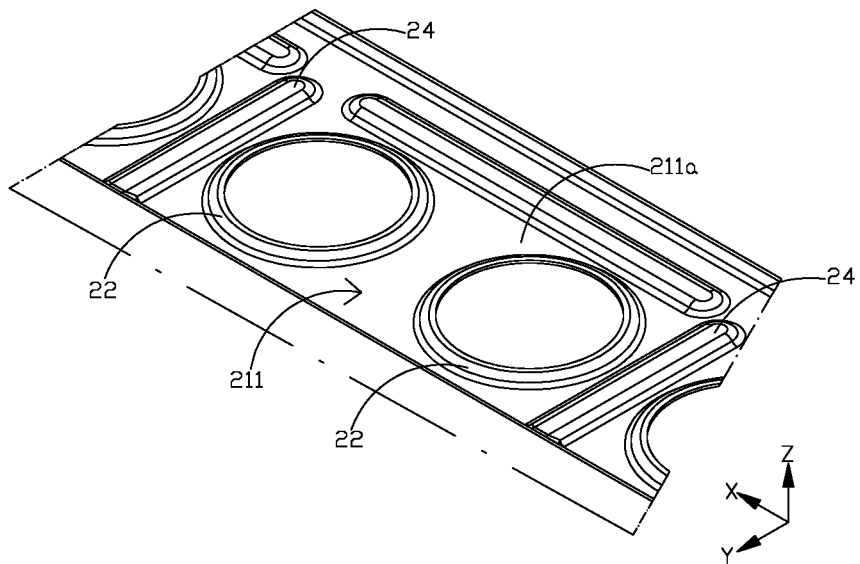
FIG. 14 is a local detailed view of a position V shown in FIG. 13.

Specifically, as shown in FIG. 13 and FIG. 14, in a possible design, the body portion 21 includes a plurality of second bulges 24. Each second bulge 24 is disposed on the bottom wall 211a of the accommodation slot 211, and situated on an outer rim of the first bulge 22. A protrusion direction of the second bulge 24 is identical to that of the first bulge 22, that is, a direction away from the battery cell 1. The metal particles generated during the welding between the connecting plate 3 and the electrode terminal 11 move in a direction away from the welding position. When touching the second bulge 24 during the movement, the metal particles can rebound or slide to the accommodation slot 211 under the action of the second bulge 24. In this way, The accommodation slot 211 can collect the metal particles generated during the welding, thereby facilitating the collection and clean-up of the metal particles.

More specifically, the accommodation slot 211 is divided into different collection regions by the second bulge 24. The first bulge 22 may be disposed in each collection region. The quantity of the first bulges 22 may be one or more. In addition, the electrode terminals 11 connected by the same connecting plate 3 may be situated in the same collection region. In this way, the metal particles generated during the welding fall into the collection region near the welding position, and are easier to clean up.

In the foregoing embodiment, the second bulge 24 not only serves to collect the metal particles generated by the welding, but also serves to locate the connecting plate 3. At the time of welding the connecting plate 3, the connecting plate 3 can be situated between adjacent second bulges 24, and the connecting plate 3 can also abut against the second bulges 24 on both sides, so that the connecting plate 3 can be located by using the second bulges 24. This increases the accuracy of locating the connecting plate 3, enables the connecting plate 3 to cover the via hole 222a of the insulation board 2, and improves the reliability of connection between the connecting plate 3 and the electrode terminal 11.

Figure 15:
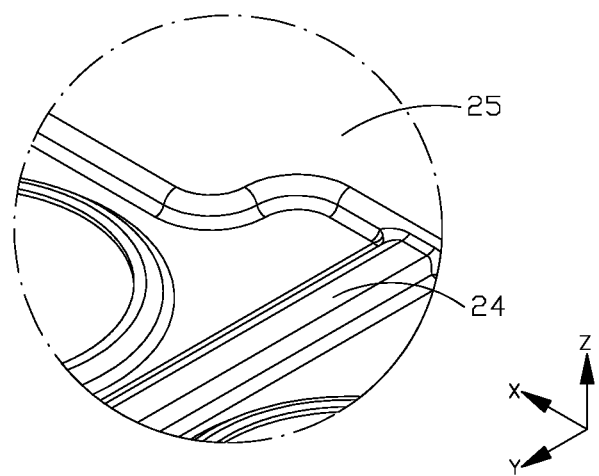
FIG. 15 is a local detailed view of a position VI shown in FIG. 13.

In a possible design, as shown in FIG. 15, the insulation board 2 may contain a third bulge 25. The third bulge 25 is disposed in the body portion 21, and may protrude in a direction that is identical to the protrusion directions of the first bulge 22 and the second bulge 24, that is, a direction away from the battery cell 1. The third bulge 25 may be contain a reinforcing structure. The reinforcing structure may be a common reinforcing structure such as a protuberance or a reinforcing rib, thereby improving the structural strength and service life of the insulation board 2.

In addition, the third bulge 25 and the second bulge 24 may define a collection region for collecting the metal particles generated during the welding. In addition, the third bulge 25 may further include an avoidance region. The position of the avoidance region may be selected according to the actual situation. In a possible design, the avoidance region is used to avoid terminals of a flexible printed circuit board (Flexible Printed Circuit, FPC). In this way, the structure of the insulation board 2 is optimized to reduce risks of interference between the insulation board 2 and other parts during operation.

Figure 16:
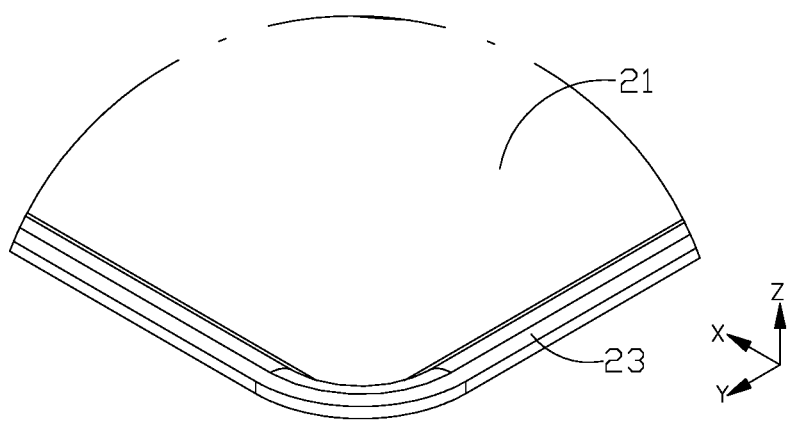
FIG. 16 is a local detailed view of a position VII shown in FIG. 13.

In a possible design, as shown in FIG. 16, the insulation board 2 may include a flange 23. The flange 23 is disposed on the outer rim of the body portion 21, and extends in a direction identical to the protrusion direction of the first bulge 22, that is, extends in a direction away from the battery cell 1. In a possible design, the flange 23 may be used to define the accommodation slot 211. When the metal particles generated by the welding touch the flange 23, the metal particles can rebound and fall into the accommodation slot 211 under the action of the flange 23, thereby facilitating the collection and clean-up of the metal particles.

Based on the battery module A according to the foregoing embodiments, this application further provides a method for assembling a battery module A. The battery module A includes a battery cell 1, an insulation board 2, and a connection plate 3. A first bulge 22 is disposed on the insulation board 2. The first bulge 22 includes a sidewall 221 and a top wall 222 that are connected. The top wall 222 and the sidewall 221 define an accommodation cavity. A via hole 222a is disposed on the top wall 222, and the via hole 222a communicates to the accommodation cavity. The assembling method includes the following steps.

S1: stacking a plurality of battery cells 1 alongside each other to form a battery cell array A1.

S2: placing the insulation board 2 on a top of the battery cell array A1 along a height direction Z, so that a part of an electrode terminal 11 of the battery cell 1 is exposed out of the via hole 222a and that the top wall 222 of the first bulge 22 covers at least a part of the electrode terminal 11.

S3: connecting the connecting plate 3 to the part of the electrode terminal 11, where the part is exposed out of the via hole 222a.

In this embodiment, when the insulation board 2 is connected to the battery cell array A1, a part of the electrode terminal 11 is exposed out of the via hole 222a of the insulation board 2, and the first bulge 22 of the insulation board 2 covers at least a part of the electrode terminal 11, thereby reducing a probability of existence of a gap between the insulation board 2 and the electrode terminal 11. Then the connecting plate 3 is welded to the part of the electrode terminal 11, the part being exposed out of the via hole 222a. This reduces the risk of letting the metal particles generated by the welding enter the position between the battery cells 1 through the gap between the insulation board 2 and the electrode terminal 11, and improves the safety and reliability of the battery module A. In addition, the metal particles generated by the welding can just stay on the surface of the battery module A, thereby facilitating cleaning.

Specifically, the insulation board 2 includes an accommodation slot 211. Before the connecting plate 3 is connected to the part of the electrode terminal 11, the part being exposed out of the via hole 222a, step S3 may further include the following step:

S31: snap-fitting the connecting plate 3 into a corresponding accommodation slot 211.

Such design facilitates the locating of the connecting plate 3 at the time of connecting the connecting plate 3 to the electrode terminal 11, increases accuracy of a relative position between the connecting plate 3 and the electrode terminal 11, and thereby improves the stability of connection between the connecting plate 3 and the electrode terminal 11.

More specifically, before the insulation board 2 is placed on the top of the battery cell array A1, step 51 may further include the following step:

S11: applying an adhesive on the top of at least a part of the battery cells 1, and/or applying the adhesive at the bottom of the insulation board 2, so that the insulation board 2 can adhere to the battery cell array A1.

The adhesive applied between the battery cell 1 and the insulation board 2 enables a fixed connection, and enhances connection stability, between the battery cell array A1 and the insulation board 2, thereby reducing the risk of existence of a gap between the battery cell array A1 and the insulation board 2 due to relative movement between the battery cell array and the insulation board, reducing the risk of letting the metal particles enter the battery module A along the gap, and improving the safety and stability of the battery module A.

The embodiments described above are merely a part of embodiments of this application, but are not intended to limit this application, and a person skilled in the art may make various modifications and changes to this application. Any modification, equivalent replacement, improvement, and the like made without departing from the spirit and principles of this application shall fall within the protection scope of this application.

What is claimed is:
1. A battery module comprising:
   a plurality of battery cells, comprising electrode terminals;
   a connecting plate, configured to be welded to the electrode terminals; and
   an insulation board, disposed on a top of the plurality of battery cells, wherein the insulation board comprises a body portion and a plurality of first bulges protruding in relation to the body portion;

wherein each first bulge comprises a sidewall connected to the body portion and a top wall connected to a top of the sidewall, the sidewall and the top wall are configured to close in to form an accommodation cavity, at least a part of each electrode terminal is accommodated in the accommodation cavity, and the top wall covers a part of the electrode terminal;

wherein a recessed region is disposed on the body portion, and the recessed region is recessed toward the electrode terminal to form an accommodation slot;

wherein the plurality of first bulges are is disposed on a bottom wall of the accommodation slot and are disposed inside the accommodation slot;

wherein a plurality of second bulges connected to the bottom wall are disposed on the body portion, each second bulge is located on an outer rim of a corresponding first bulge and is located inside the accommodation slot, and a protrusion direction of said each second bulge is identical to that of the corresponding first bulge;

wherein the accommodation slot is divided into different collection regions by the plurality of second bulges, each collection region is provided with at least one of the plurality of first bulges; and wherein the electrode terminals connected by the same connecting plate are situated in the same collection region.

2. The battery module according to claim 1, wherein a via hole is disposed on the top wall, the via hole runs through to the accommodation cavity, and a part of the electrode terminal is exposed out of the via hole.

3. The battery module according to claim 2, wherein the electrode terminal comprises a base portion and a first connecting portion protruding from the base portion, the top wall covers at least a part of the base portion, and the first connecting portion is exposed out of the via hole.

4. The battery module according to claim 3, wherein, along a thickness direction of the insulation board, a top surface of the first connecting portion is not lower than a top surface of the top wall.

5. The battery module according to claim 2, wherein the connecting plate is located on a side of the insulation board away from the a plurality of battery cells; and the connecting plate is configured to be welded to the part of the electrode terminal, the part being exposed out of the via hole.

6. The battery module according to claim 5, wherein the connecting plate covers the via hole.

7. The battery module according to claim 1, wherein the insulation board comprises a flange, and the flange is disposed on an outer rim of the body portion, and the flange is used to define the accommodation slot; and an extension direction of the flange is identical to the protrusion direction of the first bulge.

8. A battery pack, wherein the battery pack comprises a box body and a battery module, and the battery module is accommodated in the box body;

wherein the battery module comprises:

a plurality of battery cells, comprising electrode terminals;

a connecting plate, configured to be welded to the electrode terminals; and an insulation board, disposed on a top of the plurality of battery cells, wherein the insulation board comprises a body portion and a plurality of first bulges protruding in relation to the body portion;

wherein each first bulge comprises a sidewall connected to the body portion and a top wall connected to a top of the sidewall, the sidewall and the top wall are configured to close in to form an accommodation cavity, at least a part of each electrode terminal is accommodated in the accommodation cavity, and the top wall covers a part of the electrode terminal;

wherein a recessed region is disposed on the body portion, and the recessed region is recessed toward the electrode terminal to form an accommodation slot;

wherein the plurality of first bulges are disposed on a bottom wall of the accommodation slot and are disposed inside the accommodation slot;

wherein a plurality of second bulges connected to the bottom wall are disposed on the body portion, each second bulge is located on an outer rim of a corresponding first bulge and is located inside the accommodation slot, and a protrusion direction of said each second bulge is identical to that of the corresponding first bulge;

wherein the accommodation slot is divided into different collection regions by the plurality of second bulges, each collection region is provided with at least one of the plurality of first bulges; and wherein the electrode terminals connected by the same connecting plate are situated in the same collection region.

9. A device comprising:

a battery pack and the battery pack is configured to provide electrical energy;

wherein the battery pack comprises a box body and a battery module, and the battery module is accommodated in the box body;

wherein the battery module comprises:

a plurality of battery cells, comprising electrode terminals;

a connecting plate, configured to be welded to the electrode terminals; and an insulation board, disposed on a top of the plurality of battery cells, wherein the insulation board comprises a body portion and a plurality of first bulges protruding in relation to the body portion;

wherein each first bulge comprises a sidewall connected to the body portion and a top wall connected to a top of the sidewall, the sidewall and the top wall are configured to close in to form an accommodation cavity, at least a part of each electrode terminal is accommodated in the accommodation cavity, and the top wall covers a part of the electrode terminal;

wherein a recessed region is disposed on the body portion, and the recessed region is recessed toward the electrode terminal to form an accommodation slot;

wherein the plurality of first bulges are disposed on a bottom wall of the accommodation slot and are disposed inside the accommodation slot;

wherein a plurality of second bulges connected to the bottom wall are disposed on the body portion, each second bulge is located on an outer rim of a corresponding first bulge and is located inside the accommodation slot, and a protrusion direction of said each second bulge is identical to that of the corresponding first bulge;

wherein the accommodation slot is divided into different collection regions by the plurality of second bulges, each collection region is provided with at least one of the plurality of first bulges; and wherein the electrode terminals connected by the same connecting plate are situated in the same collection region.

10. The battery module according to claim 3, wherein the sidewall of the part of the electrode terminal, the part extending out of the via hole, is configured to abut against the sidewall of the via hole, and there is no gap between the electrode terminal and the sidewall of the via hole.

11. The battery module according to claim 5, wherein the connecting plate includes a recess and at least two second connecting portions;

the second connecting portions are situated on two opposite sides of the recess respectively and the recess is recessed toward the insulation board;

the second connecting portions are configured to connect to the first connecting portion of the electrode terminal, and the recess is situated between the two electrode terminals connected to the connecting plate, so as to facilitate locating of the connecting plate.

12. The battery module according to claim 1, wherein a connecting plate is situated between adjacent second bulges, and the connecting plate is also configured to abut against the second bulges on both sides.

* * * * *